(12) United States Patent
Nishiura

(10) Patent No.: US 11,600,444 B2
(45) Date of Patent: Mar. 7, 2023

(54) CERAMIC ELECTRONIC DEVICE AND MANUFACTURING METHOD OF THE SAME

(71) Applicant: TAIYO YUDEN CO., LTD., Tokyo (JP)

(72) Inventor: Shin Nishiura, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 137 days.

(21) Appl. No.: 16/953,962

(22) Filed: Nov. 20, 2020

(65) Prior Publication Data

US 2021/0166882 A1 Jun. 3, 2021

(30) Foreign Application Priority Data

Dec. 3, 2019 (JP) .............................. JP2019-218826

(51) Int. Cl.
*H01G 4/30* (2006.01)
*H01G 4/012* (2006.01)
(Continued)

(52) U.S. Cl.
CPC ........... *H01G 4/30* (2013.01); *C04B 35/4682* (2013.01); *H01G 4/008* (2013.01); *H01G 4/012* (2013.01);
(Continued)

(58) Field of Classification Search
CPC ........ H01G 4/30; H01G 4/012; H01G 4/1227; H01G 4/2325; H01G 4/1209; H01G 4/228;
(Continued)

(56) References Cited

U.S. PATENT DOCUMENTS 6,876,538 B1* 4/2005 Kim .................... B32B 18/00
156/89.12
9,236,185 B1* 1/2016 Oguni ..................... C04B 35/49
(Continued)

FOREIGN PATENT DOCUMENTS

JP 06-140277 A 5/1994
JP 07-235442 A 9/1995
(Continued)

OTHER PUBLICATIONS

Notice of Reasons for Refusal Office Action dated Sep. 6, 2022, issued to Japanese Application No. 2018-210929.

*Primary Examiner* — Michael P McFadden
(74) *Attorney, Agent, or Firm* — Stein IP, LLC

(57) ABSTRACT

A ceramic electronic device includes a multilayer chip in which each of a plurality of dielectric layers and each of a plurality of internal electrode layers are alternately stacked, the plurality of internal electrode layers being alternately exposed to a first end face and a second end face of the multilayer structure. A bent portion, in which the plurality of dielectric layers in a substantially same position along a stacking direction project along the stacking direction, is formed in the multilayer chip. In the bent portion, a through-hole is formed in two or more of the plurality of internal electrode layers. The through-hole is a defect portion in a first direction in which the first end face faces with the second end face and in a second direction that is vertical to the first direction in a plane of the plurality of internal electrode layers.

15 Claims, 11 Drawing Sheets

(51) Int. Cl.
  *H01G 4/008* (2006.01)
  *C04B 35/468* (2006.01)
  *H01G 4/12* (2006.01)

(52) U.S. Cl.
  CPC ..... *H01G 4/1218* (2013.01); *C04B 2235/656* (2013.01)

(58) Field of Classification Search
  CPC .......... H01G 4/306; H01G 2/02; H01G 4/008; H01G 4/1218; H01G 4/232; C04B 2235/656; C04B 35/4682
  See application file for complete search history.

(56) References Cited

U.S. PATENT DOCUMENTS

| | | | |
|---|---|---|---|
| 2004/0027735 A1* | 2/2004 | Hsieh | H01G 4/30 361/15 |
| 2006/0245141 A1 | 11/2006 | Shirasu et al. | 361/303 |
| 2016/0233024 A1* | 8/2016 | Kim | H01G 4/30 |
| 2017/0243695 A1 | 8/2017 | Kim et al. | |
| 2019/0096584 A1* | 3/2019 | Hong | H01G 4/30 |
| 2020/0105473 A1* | 4/2020 | Martinez | H01G 4/224 |
| 2020/0152381 A1 | 5/2020 | Matsushita | |

FOREIGN PATENT DOCUMENTS

| | | |
|---|---|---|
| JP | 2001-217137 A | 8/2001 |
| JP | 2005-085823 A | 3/2005 |
| JP | 2006-332601 A | 12/2006 |
| JP | 2011-151089 A | 8/2011 |
| JP | 2016-086118 A | 5/2016 |
| JP | 2017-152674 A | 8/2017 |
| JP | 2018-121025 A | 8/2018 |
| JP | 2020-077798 A | 5/2020 |

* cited by examiner

CERAMIC ELECTRONIC DEVICE AND MANUFACTURING METHOD OF THE SAME

CROSS-REFERENCE TO RELATED APPLICATION

This application is based upon and claims the benefit of priority of the prior Japanese Patent Application No. 2019-218826, filed on Dec. 3, 2019, the entire contents of which are incorporated herein by reference.

FIELD

A certain aspect of the present invention relates to a ceramic electronic device and a manufacturing method of the ceramic electronic device.

BACKGROUND

Ceramic electronic devices such as multilayer ceramic capacitors are being used, in order to downsize electronic devices such as smart phones. Downsizing of the electronic devices is requested. Therefore, downsizing and capacity enlargement of the ceramic electronic devices are requested. In order to downsize the ceramic electronic devices and enlarge capacity of the ceramic electronic devices, it is thought that the thickness of dielectric layers and the thickness of interna electrode layers are reduced. However, the thicknesses are reduced, delamination may occur. And so, there is disclosed technology in which an opening is formed in the internal electrode layers (for example, see Japanese Patent Application Publication No. 2018-121025, Japanese Patent Application Publication No. 2005-85823, and Japanese Patent Application Publication No. 2001-217137).

SUMMARY OF THE INVENTION

However, the structure is uneven in a stacking direction. In this case, balance of internal stress is broken. And the internal stress is concentrated in a part of the structure. Therefore, reliability of the ceramic electronic devices may be degraded.

According to an aspect of the present invention, there is provided a ceramic electronic device including: a multilayer chip in which each of a plurality of dielectric layers and each of a plurality of internal electrode layers are alternately stacked, a main component of the plurality of dielectric layers being ceramic, the multilayer chip having a rectangular parallelepiped shape, the plurality of internal electrode layers being alternately exposed to a first end face and a second end face of the multilayer structure, the first end face facing with the second end face, wherein a bent portion, in which the plurality of dielectric layers in a substantially same position along a stacking direction project along the stacking direction, is formed in the multilayer chip, wherein, in the bent portion, a through-hole is formed in two or more of the plurality of internal electrode layers, wherein the through-hole is a defect portion in a first direction in which the first end face faces with the second end face and in a second direction that is vertical to the first direction in a plane of the plurality of internal electrode layers.

According to another aspect of the present invention, there is provided a manufacturing method of a ceramic electronic device including: a first step of printing a pattern of metal conductive paste on a green sheet including main component ceramic particles; a second step of obtaining a ceramic multilayer structure by stacking a plurality of stack units obtained by repeating the first step; a third step of crimping the ceramic multilayer structure in a stacking direction; and a fourth step of firing the ceramic multilayer structure, wherein a bent portion is formed in two or more of the stack units in a substantially same position along the stacking direction in the third step, by forming a pinhole at a predetermined position of the pattern of the plurality of stack units in the first step, the bent portion projecting along the stacking direction.

DETAILED DESCRIPTION

A description will be given of an embodiment with reference to the accompanying drawings.

Embodiment

Figure 1:
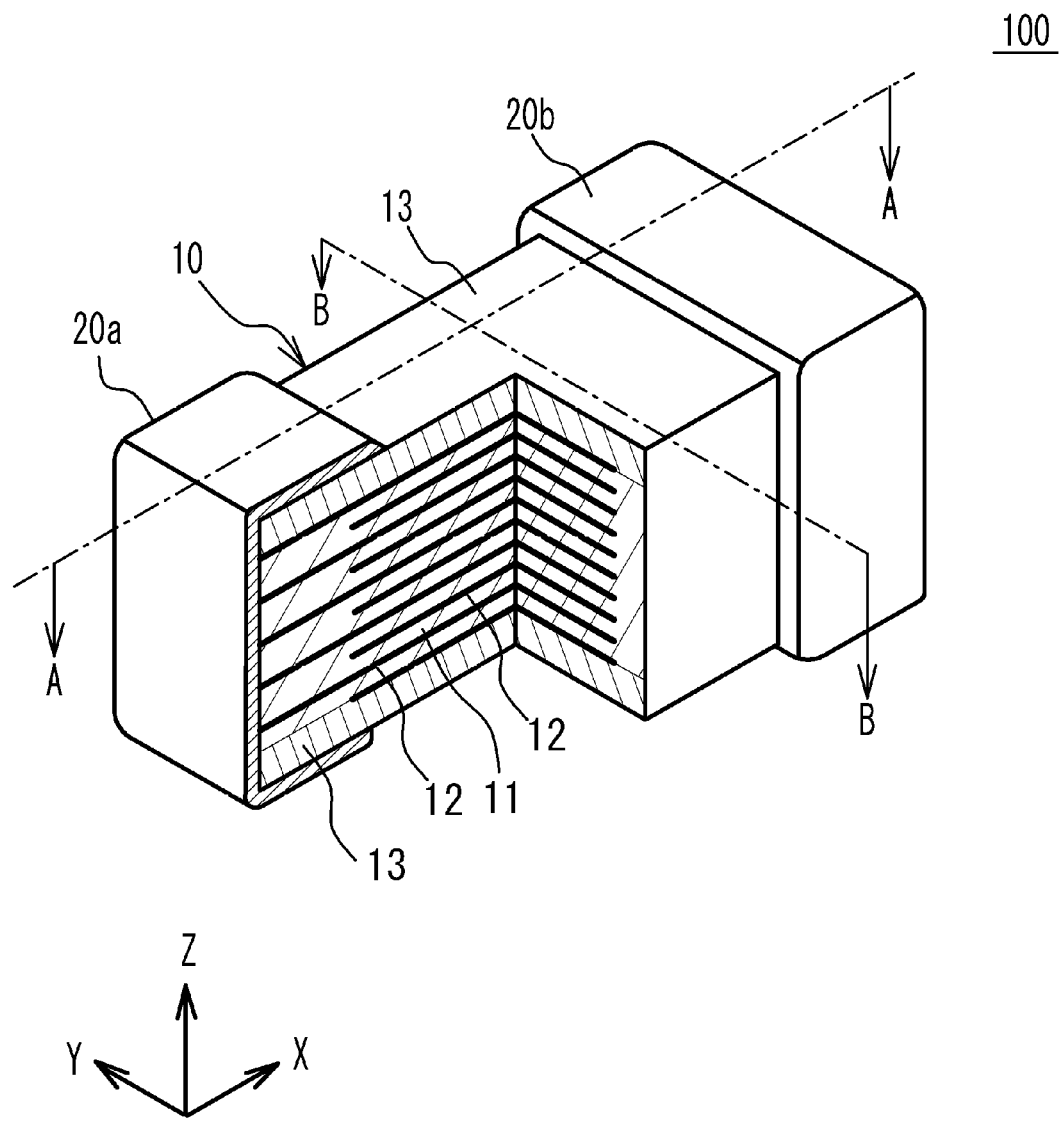
FIG. 1 illustrates a partial perspective view of a multilayer ceramic capacitor.
Figure 2:
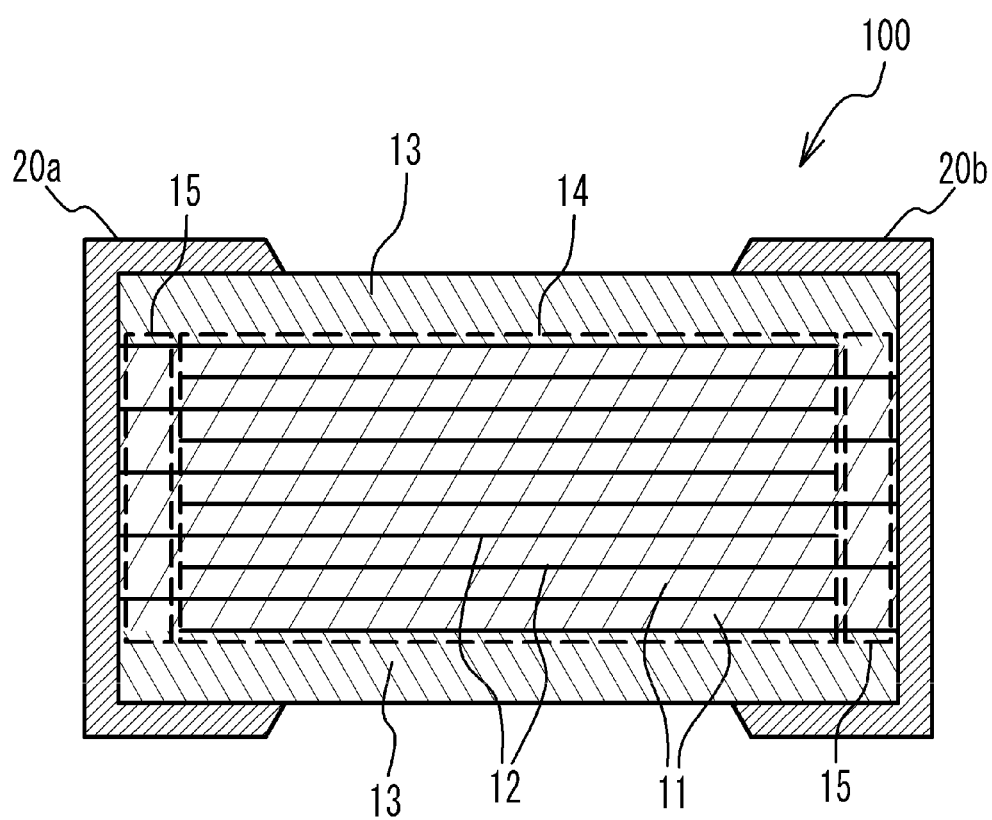
FIG. 2 illustrates a cross sectional view taken along a line A-A of FIG. 1.
Figure 3:
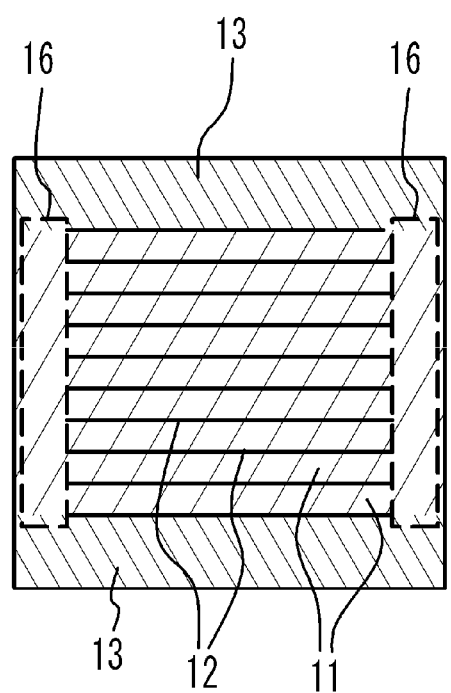
FIG. 3 illustrates a cross sectional view taken along a line B-B of FIG. 1.

A description will be given of an outline of a multilayer ceramic capacitor. FIG. 1 illustrates a partial perspective view of a multilayer ceramic capacitor 100 in accordance with an embodiment. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. Two faces other than an upper face and a lower face in a stacking direction among four faces other than the two end faces are referred to as side faces. The external electrodes 20a and 20b extend to the upper face, the lower face and the two side faces. However, the external electrodes 20a and 20b are spaced from each other.

In FIG. 1, an X-axis direction (first direction) is a longitudinal direction of the multilayer chip 10 in which two end faces of the multilayer chip 10 face with each other. Therefore, in the X-axis direction, the external electrode faces with the external electrode 20b. A Y-axis direction (second direction) is a width direction of the internal electrode layer 12. A Z-axis direction is a stacking direction. The X-axis direction, the Y-axis direction and the Z-axis direction are vertical to each other. The A-A line cross section is in parallel with the X-axis and the Z-axis. The B-B line cross section it in parallel with the Y-axis and the Z-axis.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal. End edges of the internal electrode layers 12 are alternately exposed to a first end face of the multilayer chip 10 and a second end face of the multilayer chip 10 that is different from the first end face. In the embodiment, the first face faces with the second face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer structure of the dielectric layers 11 and the internal electrode layers 12, outermost layers are two of the internal electrode layers 12. An upper face and a lower face in the stack direction of the multilayer structure are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25±0.02 mm, a width of 0.125±0.02 mm and a height of 0.125±0.02 mm. The multilayer ceramic capacitor 100 may have a length of 0.4±0.02 mm, a width of 0.2±0.02 mm and a height of 0.2±0.02 mm. The multilayer ceramic capacitor 100 may have a length of 0.6±0.03 mm, a width of 0.3±0.03 mm and a height of 0.3±0.03 mm. The multilayer ceramic capacitor 100 may have a length of 1.0+0.15/−0.05 mm, a width of 0.5+0.15/−0.05 mm and a height of 0.5+0.15/−0.05 mm. The multilayer ceramic capacitor 100 may have a length of 3.2±0.20 mm, a width of 1.6±0.15 mm and a height of 1.6±0.15 mm. The multilayer ceramic capacitor 100 may have a length of 4.5±0.40 mm, a width of 3.2±0.30 mm and a height of 2.5±0.20 mm. However, the size of the multilayer ceramic capacitor 100 is not limited. "+0.15/−0.05" means a range of +0.15 mm to −0.05 mm.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1, 0 \leq y \leq 1, 0 \leq z \leq 1$) having a perovskite structure.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. And so, the section is referred to as a capacity section 14. That is, the capacity section 14 is a section in which the internal electrode layers 12 next to each other are connected to different external electrodes face each other.

A section, in which the internal electrode layers 12 connected to the external electrode 20a face with each other without sandwiching the internal electrode layer 12 connected to the external electrode 20b, is referred to as an end margin 15. A section, in which the internal electrode layers 12 connected to the external electrode 20b face with each other without sandwiching the internal electrode layer 12 connected to the external electrode 20a is another end margin 15. That is, the end margin 15 is a section in which a set of the internal electrode layers 12 connected to one external electrode face with each other without sandwiching the internal electrode layer 12 connected to the other external electrode. The end margin 15 is a section that does not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces.

Figure 4A:
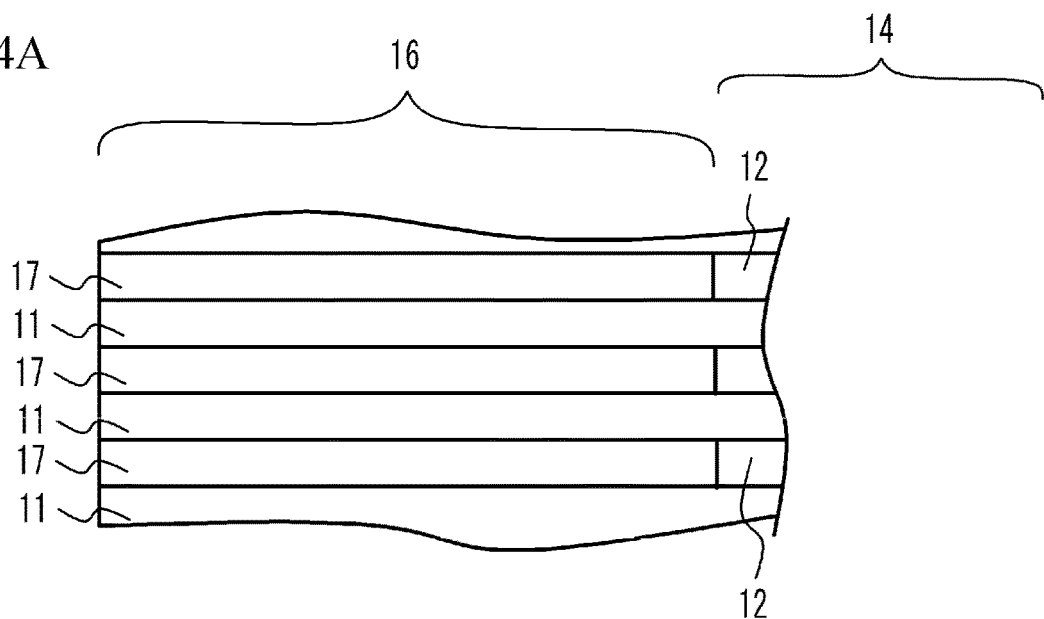
FIG. 4A illustrates an enlarged view of a cross section of a side margin.

FIG. 4A illustrates an enlarged view of the cross section of the side margin 16. The side margin 16 has a structure in which the dielectric layer 11 and a reverse pattern layer 17 are alternately stacked in a stacking direction of the dielectric layer 11 and the internal electrode layer 12 in the capacity section 14. Each of the dielectric layers 11 of the capacity section 14 are continuously formed with each of the dielectric layers 11 of the side margin 16. With the structure, a level difference between the capacity section 14 and the side margin 16 is suppressed.

Figure 4B:
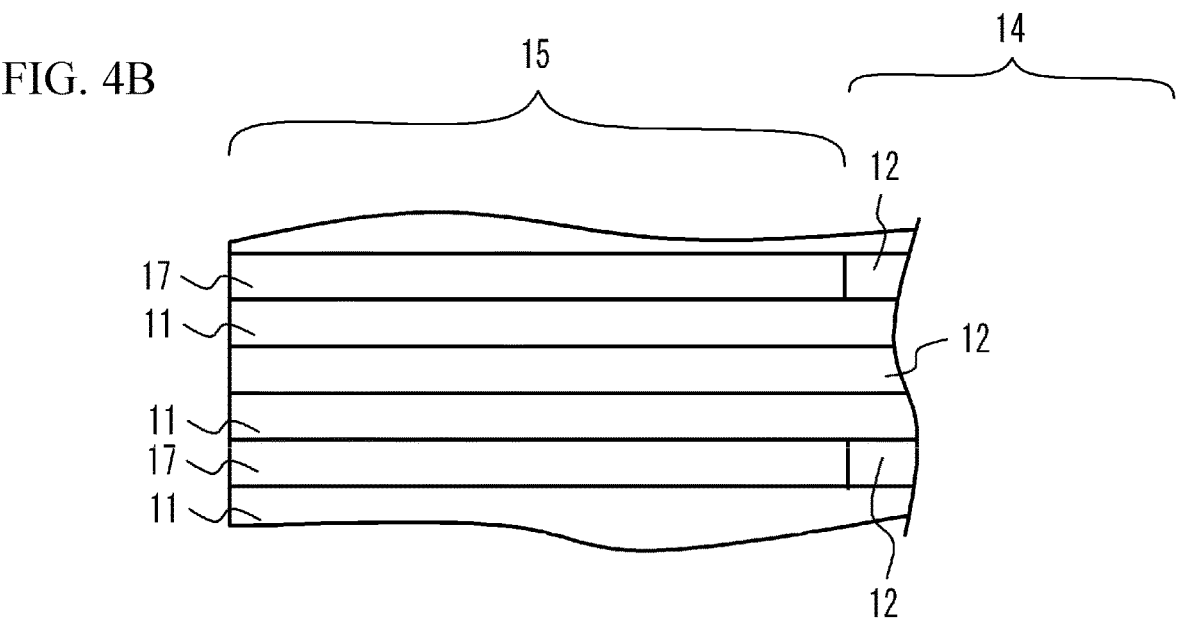
FIG. 4B illustrates an enlarged view of a cross section of an end margin.

FIG. 4B illustrates an enlarged view of the cross section of the end margin 15. Compared to the side margin 16, in the end margin 15, every other layer, the internal electrode layers 12 extends to the edge face of the end margin 15. The reverse pattern layer 17 is not provided in a layer where the internal electrode layer 12 extends to the edge face of the end margin 15. Each of the dielectric layers 11 of the capacity section 14 is continuously formed with each of the dielectric layers 11 of the end margin 15. With the structure, a level difference between the capacity section 14 and the end margin 15 is suppressed.

Downsizing and capacity enlargement of the multilayer ceramic capacitor 100 are requested. It is thought that the thickness of the dielectric layers 11 and the thickness of the internal electrode layers 12 are reduced, in order to downsize the multilayer ceramic capacitor 100 and enlarge the capacity of the multilayer ceramic capacitor 100. However, delamination may occur when the thicknesses are reduced. And so, it is thought that an aperture is formed in the internal electrode layers 12 in order to suppress the delamination. However, the structure in the stacking direction may be uneven in accordance with the position of the aperture. Therefore, balance of inner stress may be broken, and stress is locally concentrated to a part of the multilayer ceramic capacitor 100. And reliability of the multilayer ceramic capacitor 100 may be degraded. And so, the multilayer ceramic capacitor 100 has a structure for suppressing the delamination and degradation of the reliability.

Figure 5:
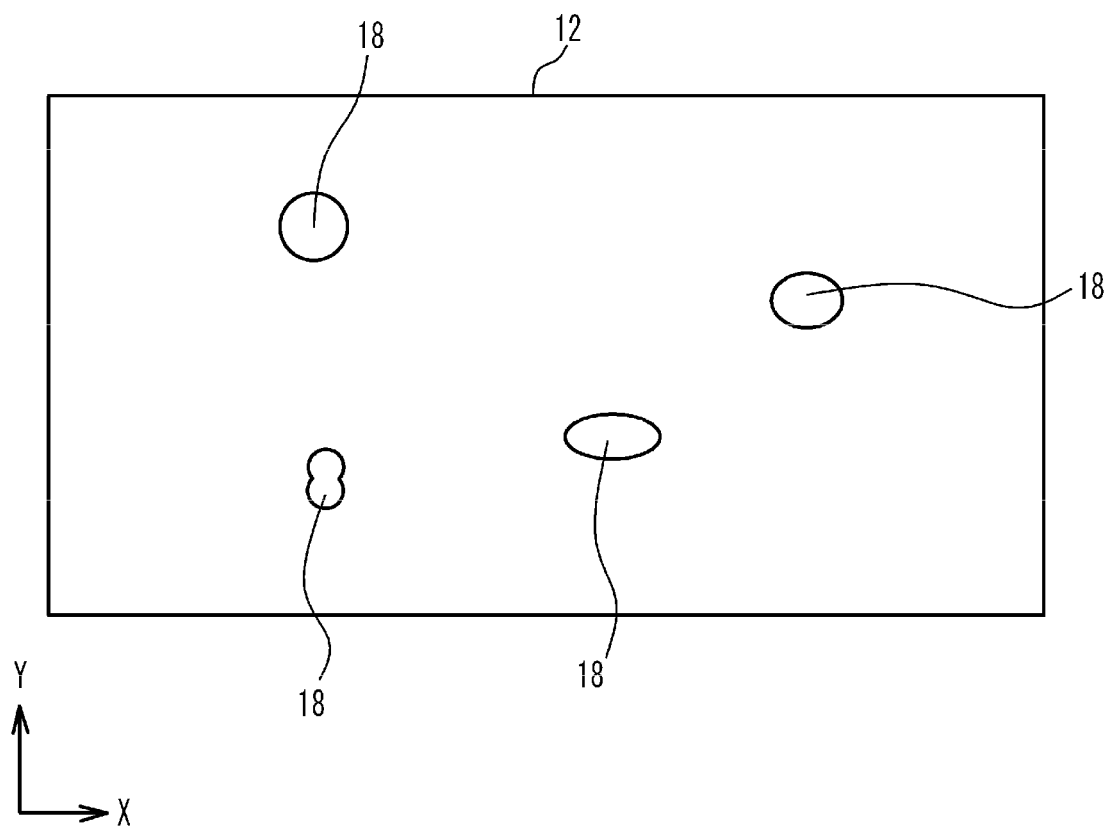
FIG. 5 illustrates a plan view of an internal electrode layer.

FIG. 5 illustrates a plan view of the internal electrode layer 12. As illustrated in FIG. 5, the internal electrode layer 12 has one or more through-holes 18. The through-hole 18 is a defect portion of a part of the internal electrode layer 12.

The shape of the through-hole 18 is not limited. For example, the shape of the through-hole 18 is a circle, an ellipse, a connection of two circles, or the like, in a planar view. The through-hole 18 is located on the inner side than circumference of the internal electrode layer 12, in the X-axis direction and the Y-axis direction. The through-hole 18 extends in the X-axis direction and the Y-axis direction. Therefore, the through-hole 18 does not extend to the circumference of the internal electrode layer 12 in the X-axis direction and the Y-axis direction.

Figure 6A:
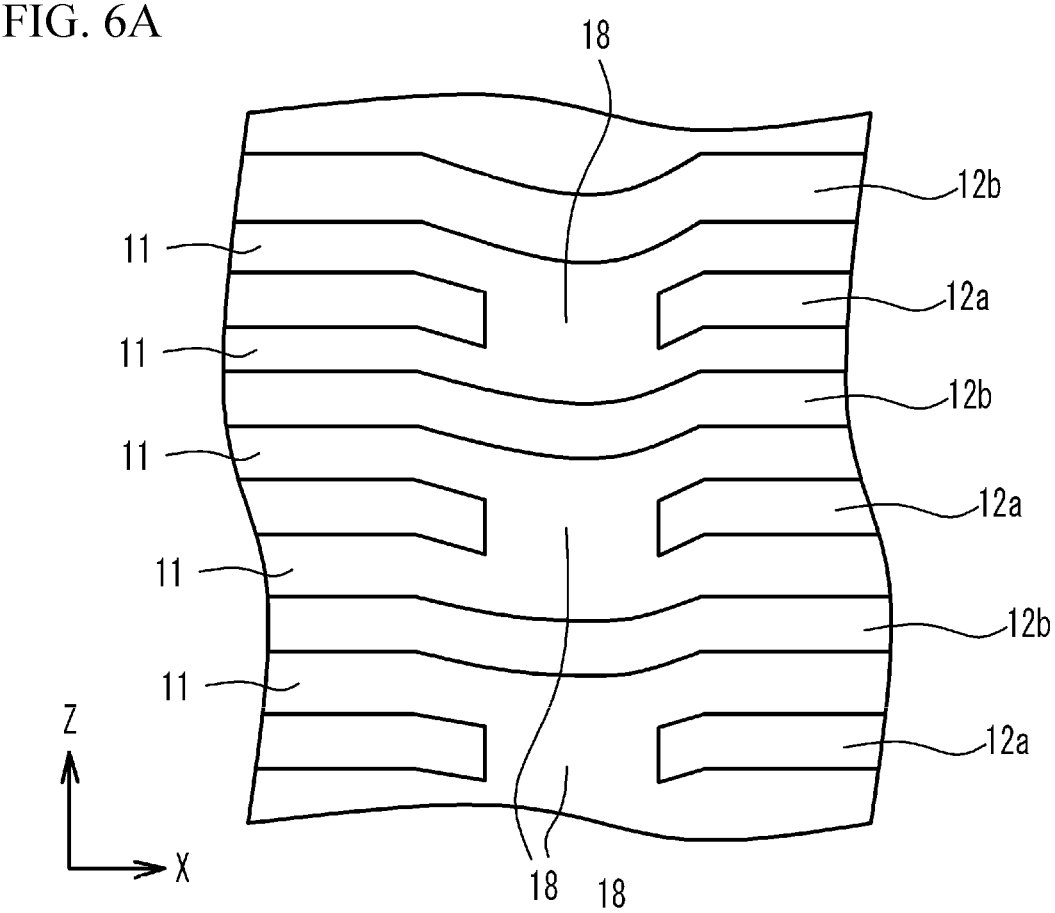
FIG. 6A and FIG. 6B is a cross sectional view of a part of a capacity section in which dielectric layers and internal electrode layers are stacked.
Figure 6B:
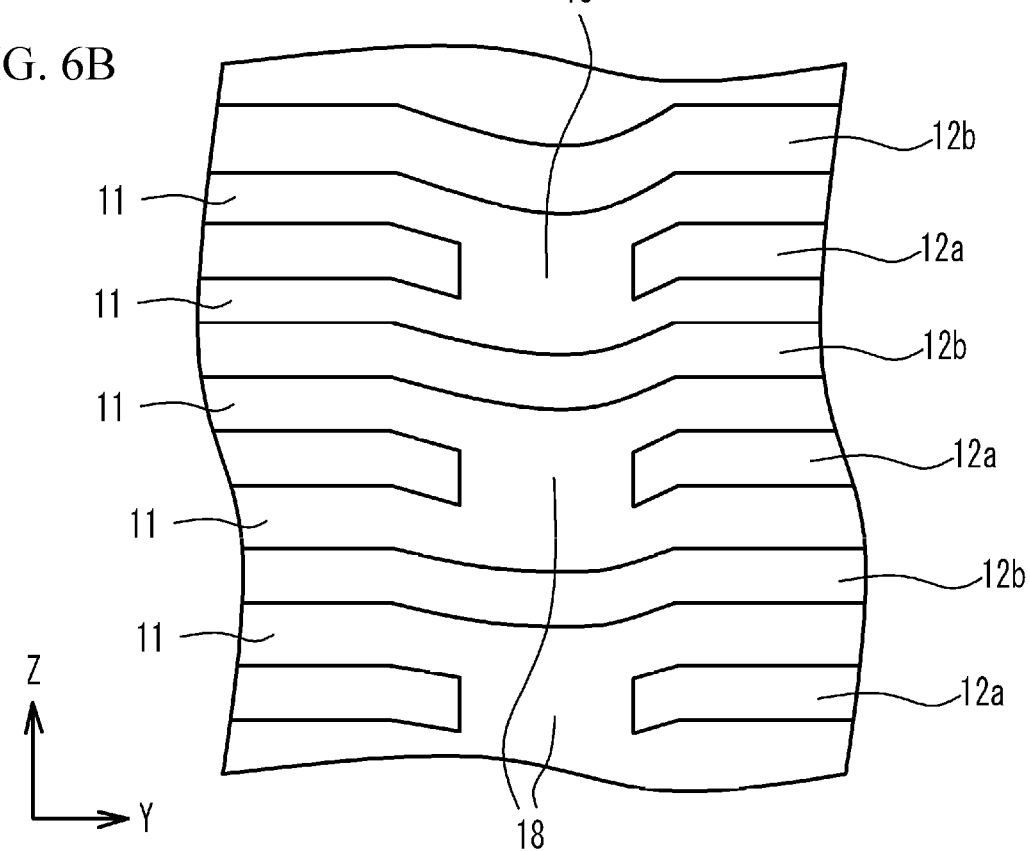

FIG. 6A and the FIG. 6B illustrate cross sectional views of a part of the multilayer structure of the dielectric layers 11 and the internal electrode layers 12 in the capacity section 14. The cross section of FIG. 6A is a partially enlarged view of the cross section taken along the line A-A of FIG. 1. FIG. 6B illustrates a partially enlarged view of the cross section taken along the line B-B of FIG. 1. FIG. 6A and FIG. 6B include an intersection point of the A-A line and the B-B line. FIG. 6A and FIG. 6B illustrate cross sections of an identical multilayer portion.

In FIG. 6A and FIG. 6B, the internal electrode layer 12 connected to the external electrode 20a of FIG. 1 is referred to as a first internal electrode layer 12a. The internal electrode layer 12 connected to the external electrode 20b of FIG. 1 is referred to as a second internal electrode layer 12b. As illustrated in FIG. 6A and FIG. 6B, in an identical portion along the stacking direction in the multilayer structure in which the first internal electrode layer 12a, the dielectric layer 11 and the second internal electrode layer 12b are stacked, the second internal electrode layer 12b does not have the through-hole 18, but the first internal electrode layer 12a has the through-hole 18.

With the structure, in a section where two or more of the through-holes 18 are located in the same position along the stacking direction, a bent portion is formed. In the bent portion, the dielectric layers 11 project in one of the stacking directions. In FIG. 6A and FIG. 6B, the bent portion projecting toward the lower side of the stacking direction is formed. In the bent portion, the first internal electrode layer 12a, the second internal electrode layer 12b and the dielectric layers 11 are also bent along the bent portion. The bent portion is defined by the shape of lines contacting to the second internal electrode layer 12b and the dielectric layers 11 in FIG. 6.

When the bent portion is formed, anchor effect is achieved and the delamination is suppressed. When the through-hole 18 extends through two or more internal electrode layers, the bent portion continuously extends in the stacking direction. That is, the bent portion is formed in two or more layers. Thus, the delamination is suppressed in the two or more layers. Unevenness of the structure in the stacking direction is suppressed, because a plurality of through-holes 18 are formed in an identical location along the stacking direction. Therefore, stress concentration is suppressed. And degradation of the reliability is suppressed. It is therefore possible to suppress the delamination and suppress degradation of the reliability. An oscillation direction is not uneven in the bent portion and the through-hole 18. Therefore, resonance is suppressed, and acoustic noise is suppressed.

Figure 7A:
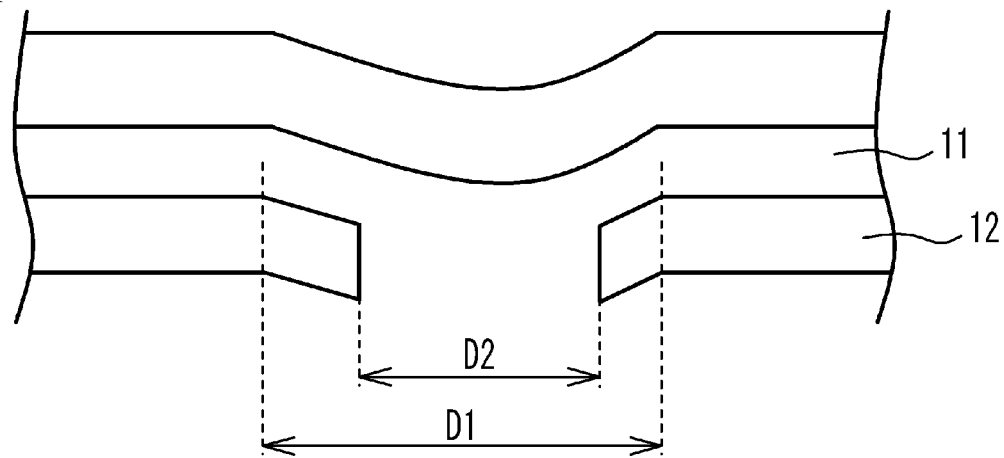
FIG. 7A is a cross sectional view illustrating details of a through-hole.

As illustrated in FIG. 6A and FIG. 6B, it is preferable that each of the dielectric layers 11 are bent so that bending degree of the bent portion of the dielectric layers 11 is lessened (a curvature radius gets larger), toward a lower side of FIG. 6, that is toward a convex edge of the bent portion. This is because with the shape, the stress caused by the electrode portion is even and is not straight-line shape, the stress concentration is lessened, and maximum stress of the whole of the bent portion can be reduced FIG. 7A is a cross section illustrating details of the through-hole 18. As illustrated in FIG. 7A, the through-hole 18 is a defect portion having a length D2 which is half or more of a length D1 of the bent portion in a planar view, in the A-A line cross section and the B-B line cross section. The bent portion is a section from one of inflection points of the dielectric layer 11 to the other, as defined by D1 of FIG. 7A. The through-hole 18 is located in a position at which the bent portion is maximumly caved (maximumly projected). The diameter of the through-hole 18 is, for example, 10 μm to 100 μm, in the A-A line cross section and the B-B line cross section. The curvature radius of the internal electrode layer is the smallest in the portion where the bent portion is maximumly caved. Therefore, the inner stress is partially concentrated in the portion where the bent portion is maximumly caved (maximumly projected), because large stress is locally concentrated in the portion because of shrinkage strain caused by difference of thermal expansion coefficients of the dielectric layer 11 and the internal electrode layer 12. However, the stress of stress of the bent portion can be lessened, when the through-hole 18 is formed in the portion.

Figure 7B:
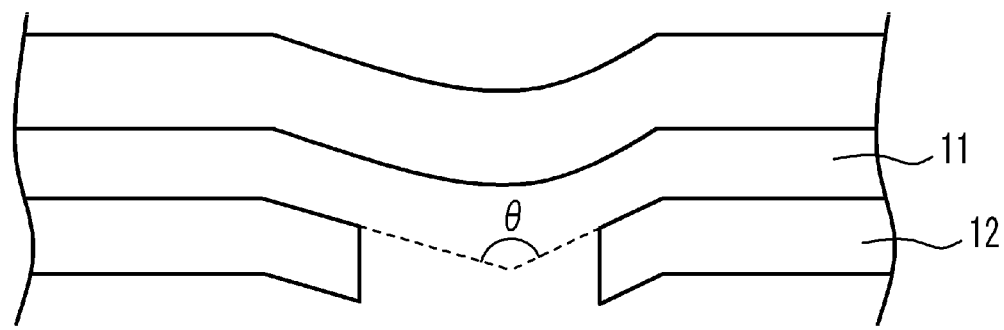
FIG. 7B is a cross sectional view illustrating an angle of a bent portion sandwiching a through-hole.

FIG. 7B is a cross sectional view illustrating an angle formed by the bent portion sandwiching the through-hole 18. As illustrated in FIG. 7B, the angle θ formed by the bent portion sandwiching the through-hole 18 in the X-axis direction and the Y-axis direction is an angle formed by extended lines of the defect portion of the internal electrode layer 12. The maximum value of the angle θ is 180 degrees. However, if the angle θ is excessively large, the dielectric layers 11 evenly oscillate in the Z-axis direction and the resonance may occur when a high frequency signal is applied to the multilayer ceramic capacitor 100. It is therefore preferable that the angle θ is small. For example, it is preferable that the angle θ is less than 120 degrees. It is more preferable that the angle θ is less than 90 degrees.

When the bent portion is formed in the whole of the multilayer chip 10 in the stacking direction, crack extending through the whole of the multilayer chip 10 along the bent portion may degrade the insulation reliability. It is therefore preferable that the bent portion is formed in a part of the multilayer chip 10 in the stacking direction. For example, it is preferable that the bent portion is formed in a ¼ thickness range or less of the multilayer chip 10. On the other hand, when the range of the bent portion is excessively small in the multilayer chip 10 in the stacking direction, the inner stress may not necessarily be sufficiently suppressed. And so, it is preferable that the bent portion has a predetermined thickness or more in the multilayer chip 10 in the stacking direction. For example, it is preferable that the bent portion is formed in a ⅙ thickness range or more in the multilayer chip 10.

Figure 8A:
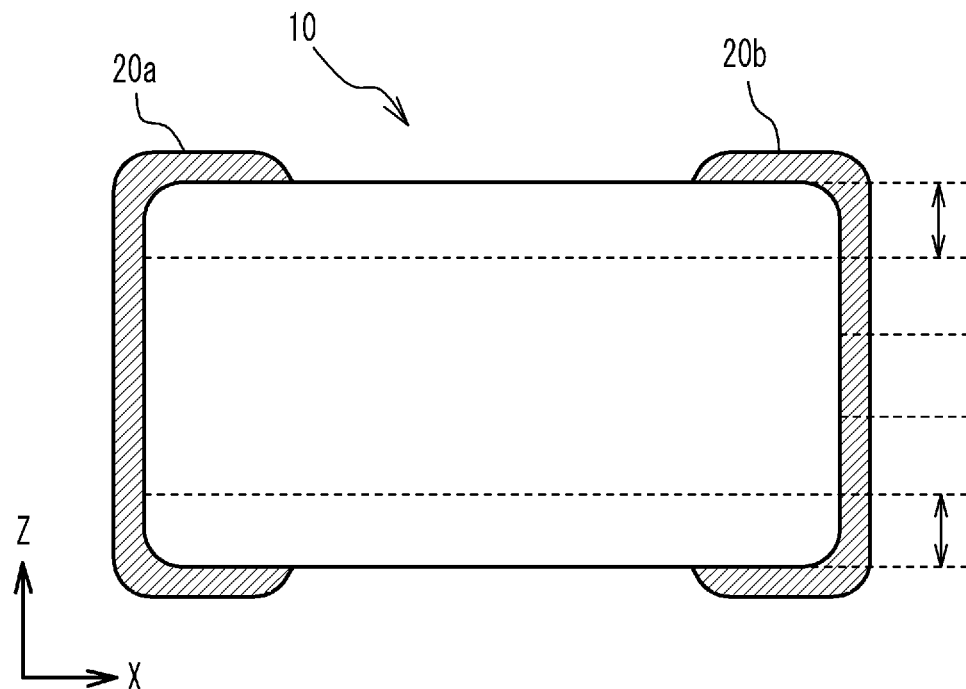
FIG. 8A and FIG. 8B illustrate a range in which a bent portion is located.
Figure 8B:
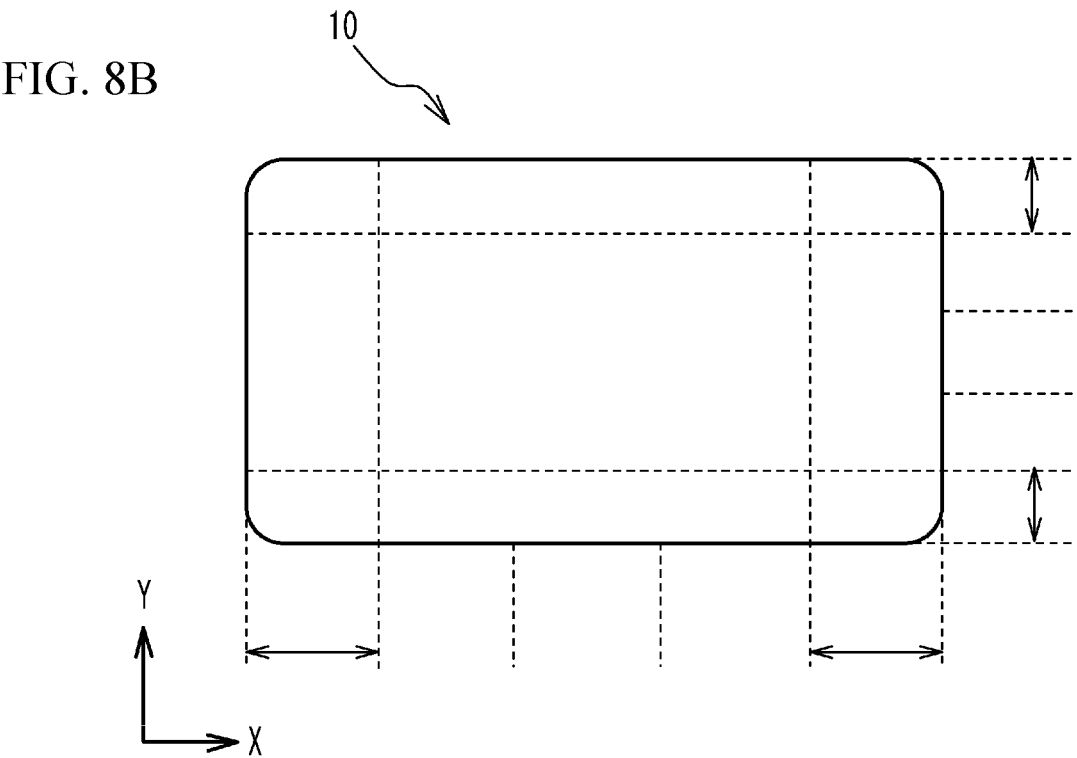

In the multilayer chip 10, the delamination caused by the stress generated in the firing process tends to occur in both edge portions in the stacking direction. Therefore, when the bent portion is formed in the both edge portions, the delamination is effectively suppressed. It is therefore preferable that the bent portion is formed in the both edge portions in the stacking direction. For example, as illustrated in FIG. 8A, the bent portion is formed in at least a part of the both ⅕ thickness ranges on the both edge portion side, on a presumption that the multilayer chip 10 is divided into 5 equal portions. In FIG. 8A, the inner structure of the multilayer chip 10 is not illustrated Next, the delamination caused by the stress generated in the firing process tends to occur in an outer circumference portion viewed from the top face of the multilayer chip 10. Therefore, when the bent portion is formed in the circumference portion, the delamination is effectively suppressed. Therefore, as illustrated in FIG. 8B, it is preferable that the bent portion is formed in a ⅕ width range of the circumference portion, when the multilayer chip 10 is viewed from the top face.

Figure 9A:
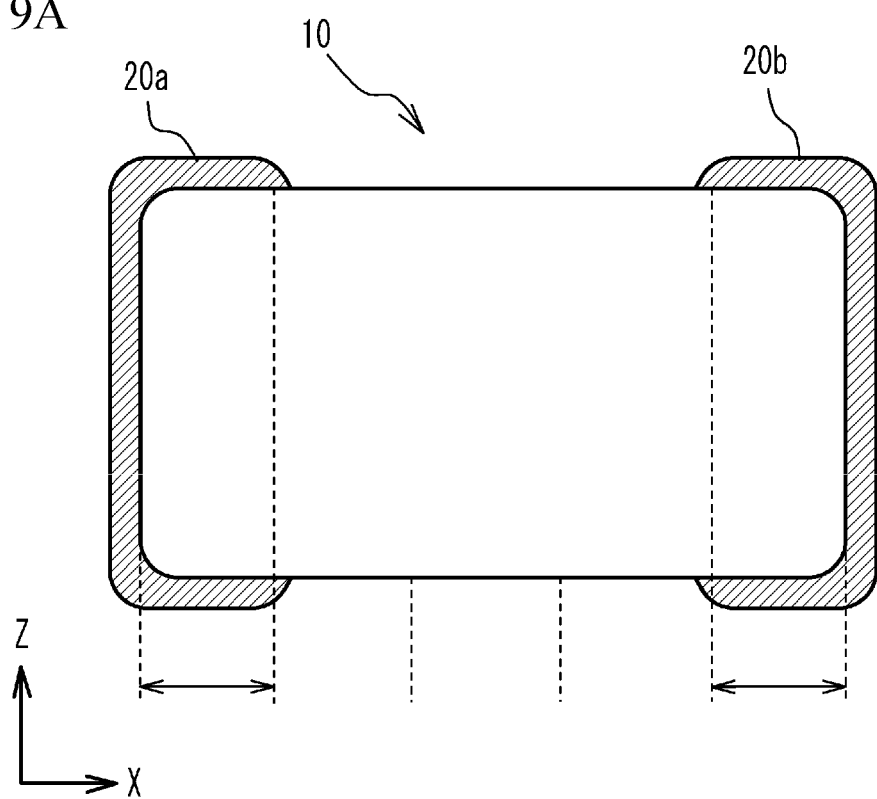
FIG. 9A and FIG. 9B illustrate a range in which a bent portion is located.

Next, in both end portions in a direction in which the external electrodes face with each other, the delamination tends to occur because of the stress applied to the multilayer chip 10 from the external electrodes. When the bent portion is formed in the end portions, the delamination is effectively suppressed. Therefore, as illustrated in FIG. 9A, on a presumption that the multilayer chip 10 is divided into five equal portions having a ⅕ width in the X-axis direction, it is preferable that the bent portion is formed in at least a part of the both end portion having the ⅕ width.

Figure 9B:
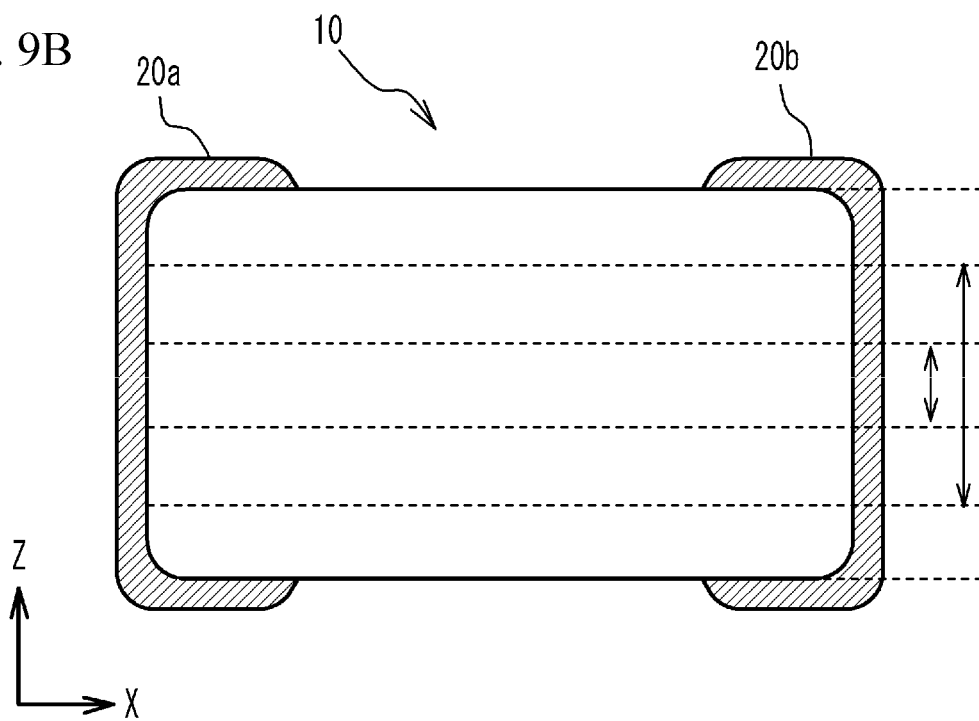

Next, when the bent portion is formed in a center portion of the multilayer chip 10 in the stacking direction, the oscillation of the acoustic noise resonance is suppressed in the center portion of the multilayer chip 10. Therefore, the acoustic noise is effectively suppressed. It is therefore preferable that the bent portion is formed in the center portion of the multilayer chip 10 in the stacking direction. For example, as illustrated in FIG. 9B, it is preferable that the bent portion is formed in at least a part of inner ⅗ thickness range, on a presumption that the multilayer chip 10 is divided into five equal parts. It is more preferable that the bent portion is formed in at least a part of the center ⅕ thickness range.

In FIG. 6A and FIG. 6B, the through-hole 18 is formed in the first internal electrode layer 12a. However, the structure is not limited. For example, there may be a case where the through-hole 18 is not formed in each of the first internal electrode layers 12a and is formed in each of the second internal electrode layers 12b, in an identical location along the stacking direction in the multilayer structure in which the first internal electrode layers 12a, the dielectric layers 11 and the second internal electrode layers 12b are stacked.

Alternatively, in the bent portion, with respect to each of the first internal electrode layer 12a, the through-hole 18 may formed in one first internal electrode layer 12a among each of a few first internal electrode layers 12a. For example, the through-hole 18 may be formed in every other of the first internal electrode layers 12a. Alternatively, the through-hole 18 may be formed in every third of the first internal electrode layers 12a. Alternatively, in the bent portion, the through-hole 18 may be formed in one second internal electrode layer 12b among each of a few second internal electrode layers 12b. For example, the through-hole 18 may be formed in every other of the second internal electrode layers 12b. Alternatively, the through-hole 18 may be formed in every third of the second internal electrode layers 12b.

Alternatively, in the bent portion, the thorough-hole 18 may be formed in at least two or more internal electrode layers. For example, in the bent portion, the through-hole 18 may be formed in both of the first internal electrode layers 12a and the second internal electrode layers 12b. The two through-holes 18 may be next to each other thorough one dielectric layer 11 in the stacking direction.

In FIG. 6A and FIG. 6B, the bent portion is formed in the capacity section 14 in which the first internal electrode layers 12 face with the second internal electrode layers 12b. However, the structure is not limited. For example, the bent portion may be formed in the end margin 15. The end margin 15 includes only the first internal electrode layers 12a or only the second internal electrode layers 12b. Therefore, the thorough-hole 18 is formed only in the first internal electrode layers 12a or only in the second internal electrode layers 12b.

Figure 10:
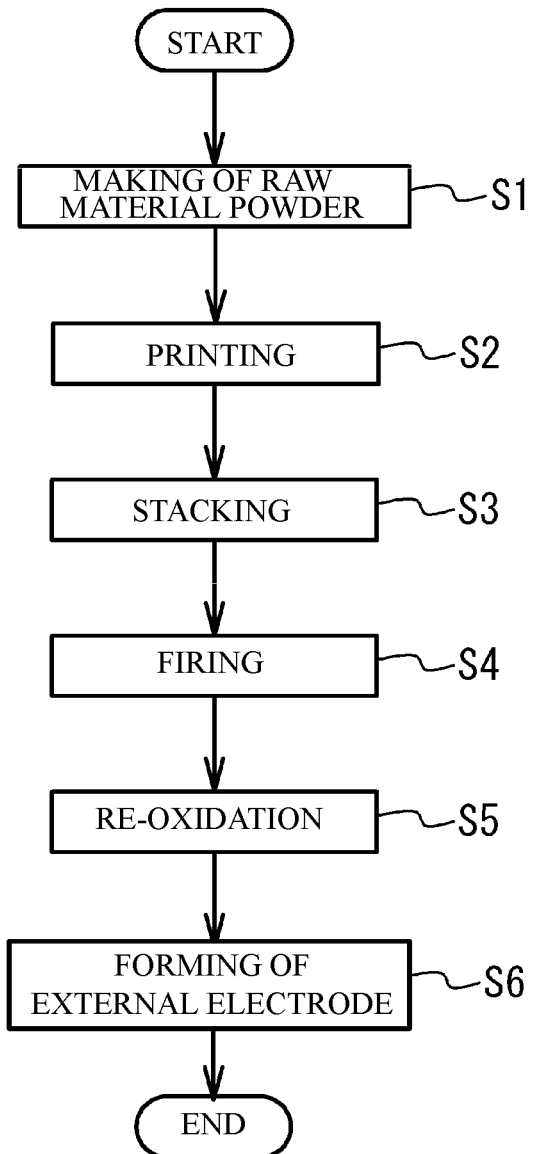
FIG. 10 illustrates a flowchart of a manufacturing method of a multilayer ceramic capacitor.

Next, a description will be given of a manufacturing method of the multilayer ceramic capacitor 100. FIG. 10 illustrates a manufacturing method of the multilayer ceramic capacitor 100.

(Making process of raw material powder) A dielectric material for forming the dielectric layers 11 is prepared. The dielectric material includes a main component ceramic of the dielectric layers 11. Generally, the A site element and the B site element are included in the dielectric layers 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layers 11. For example, a solid-phase method, a sol-gel method, a hydrothermal method or the like can be used. The embodiment may use any of these methods.

Additive compound may be added to the obtained ceramic powder, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium), or an oxide of Co (cobalt), Ni, Li (lithium), B (boron), Na (sodium), K (potassium) and Si (silicon), or glass.

In the embodiment, it is preferable that ceramic particles structuring the dielectric layer 11 are mixed with compound including additives and are calcined in a temperature range from 820 degrees C. to 1150 degrees C. Next, the resulting ceramic particles are wet-blended with additives, are dried and crushed. Thus, ceramic powder is obtained. The grain diameter may be adjusted by crushing the resulting ceramic powder as needed. Alternatively, the grain diameter of the resulting ceramic power may be adjusted by combining the crushing and classifying.

Next, a reverse pattern material for forming the end margins 15 and the side margins 16 is prepared. The reverse pattern material includes a main component ceramic of the end margin 15 and the side margin 16. For example, $BaTiO_3$ powder is made as the main component ceramic. It is possible to make the $BaTiO_3$ powder by the same method as that of the dielectric material. An additive compound may be added to the resulting $BaTiO_3$ powder, in accordance with purposes. The additive compound may be an oxide of Mg, Mn, V, Cr or a rare earth element (Y, Sm, Eu, Gd, Tb, Dy, Ho, Er, Tm and Yb), or an oxide of Co, Ni, Li, B, Na, K and Si, or glass. The dielectric material may be used as the reverse pattern material.

In the embodiment, it is preferable that ceramic particles structuring the end margins 15 and the side margins 16 are mixed with compound including additives and are calcined in a temperature range from 820 degrees C. to 1150 degrees C. Next, the resulting ceramic particles are wet-blended with additives, are dried and crushed. Thus, ceramic powder is obtained. The grain diameter may be adjusted by crushing the resulting ceramic powder as needed. Alternatively, the grain diameter of the resulting ceramic power may be adjusted by combining the crushing and classifying.

(Printing process) Next, a binder such as polyvinyl butyral (PVB) resin, an organic solvent such as ethanol or toluene, and a plasticizer are added to the resulting dielectric material and wet-blended. With use of the resulting slurry, a base material is coated with a strip-shaped dielectric green sheet 51 with a thickness of 0.8 μm or less by, for example, a die coater method or a doctor blade method, and then dried.

Figure 11A:
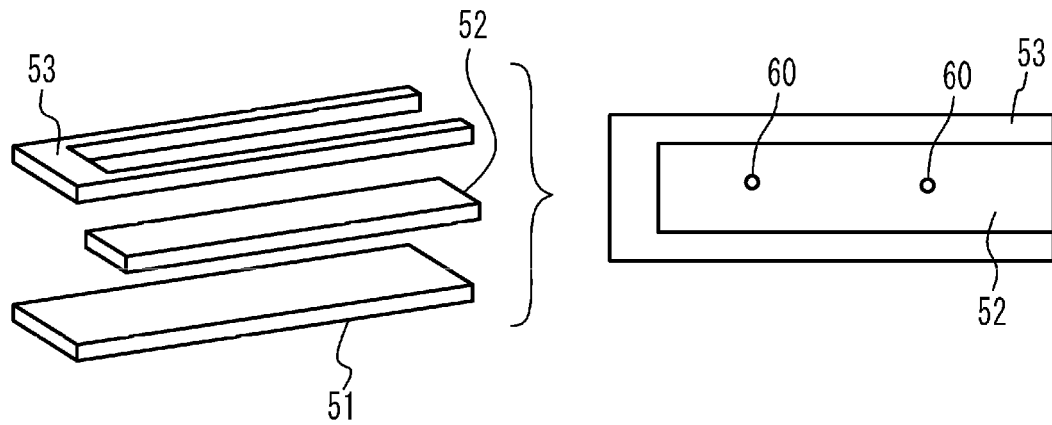
FIG. 11A and FIG. 11B illustrate a printing process and a stacking process.

Next, as illustrated in FIG. 11A, metal conductive paste for forming an internal electrode is provided on the surface of the dielectric green sheet 51 by screen printing or gravure printing. The metal conductive paste includes an organic binder. Thus, a first pattern 52 for forming an internal electrode layer is provided. As co-materials, ceramic particles are added to the metal conductive paste. A main component of the ceramic particles is not limited. However, it is preferable that the main component of the ceramic particles is the same as that of the dielectric layer 11.

A pinhole 60 is formed when the metal conductive paste is printed. The pinhole 60 formed in the printing process is located in the same printing position. For example, when filling is performed around an intersection point of mesh of a screen in the screen printing, the metal conductive paste does not pass through the filling portion. Thus, the pinhole 60 is formed in the filling portion after the screen printing. In FIG. 11A, a plurality of pinholes 60 are formed in a plurality of points of the first pattern 52.

Next, a binder and an organic solvent are added to the reverse pattern material which is made in the raw material powder making process. The binder is such as ethyl cellulose. The organic solvent is such as terpineol. And the reverse pattern material is kneaded with the binder and the organic solvent. Thus, reverse pattern paste for forming the reverse pattern layer is obtained. The reverse pattern paste is printed on a circumference area of the dielectric green sheet 51. The circumference area is a part of the dielectric green sheet 51 where the first pattern 52 is not printed. Thus, a second pattern 53 is provided. Therefore, a level difference caused by the first pattern 52 is buried. A combination of the dielectric green sheet 51, the first pattern 52 and the second pattern 53 is a first stack unit.

Figure 11B:
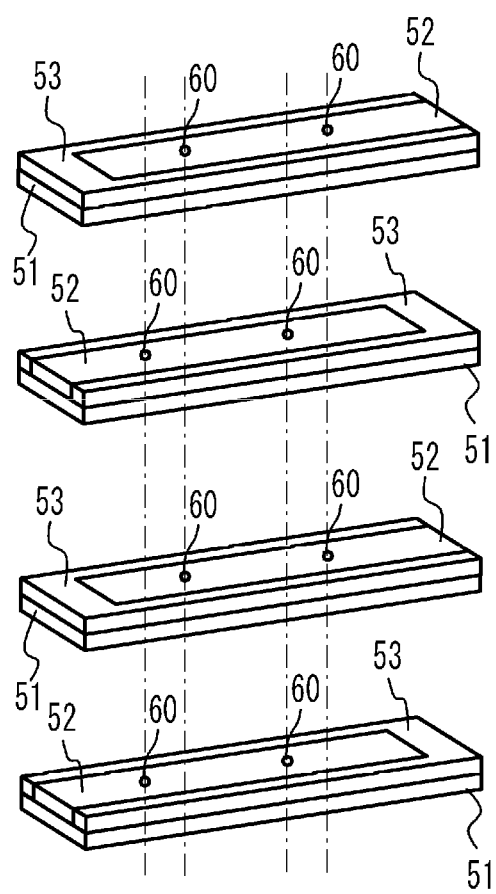

(Stacking process) Then, as illustrated in FIG. 11B, each of the stack units are alternately stacked so that the internal electrode layers 12 and the dielectric layers 11 are alternated with each other and the end edges of the internal electrode layers 12 are alternately exposed to both end faces in the length direction of the dielectric layer 11 so as to be alternately led out to a pair of external electrodes 20a and 20b of different polarizations.

The position of the pinhole 60 is alternately shifted in the stacked first patterns 52. Thus, in the same position along the stacking direction, the first pattern 52 in which the pinhole 60 is formed and the first pattern 52 in which the pinhole 60 is not formed are alternately stacked. For example, the total stack number is 100 to 500. After that, cover sheets to be the cover layers 13 are crimped to an upper face and a lower face of the multilayer structure of the stacked dielectric green sheets 51. Thus, a ceramic multilayer structure is obtained. During the crimping, the bent portion illustrated in FIG. 6A and FIG. 6B is formed. When silicon rubber which elastically deforms is used as a material contacting to the stacked sheets during the crimping, the bent portion is easily formed and the angle of the bent portion tends to be smaller. A stainless plate which hardly deforms is used as the material, the angle of the bent portion tends to be larger. One of the materials contacting to the stacked sheets during the crimping may be silicon rubber and the other may be stainless plate. It is preferable that the crimping is repeated twice or more, during the stacking process.

(Firing process) The resulting ceramic multilayer structure is fired for 10 minutes to 2 hours in a reductive atmosphere having an oxygen partial pressure of $10^{-5}$ to $10^{-8}$ atm in a temperature range of 1100 degrees C. to 1300 degrees C. In this manner, each compound is sintered. And each grain grows. Thus, the multilayer ceramic capacitor 100 is obtained.

(Re-oxidation process) After that, the re-oxidation process is performed in $N_2$ gas atmosphere in a temperature range of 600 degrees C. to 1000 degrees C.

(Plating process) After that, the external electrodes 20a and 20b are formed on the multilayer chip 10. For example, a base layer is formed on the two end faces of the multilayer chip 10, by a physical vapor deposition (PVD) method such as sputtering, or a chemical vapor deposition (CVD) method. Alternatively, the two end faces of the multilayer chip 10 may be coated with metal conductive paste for forming external electrodes, and the metal conductive paste may be fired. The metal conductive paste includes a metal filler, a glass frit, a binder and a solvent. Thus, the base layer may be formed. Alternatively, the two end faces of the ceramic multilayer structure before the firing may be coated with metal conductive paste for forming external electrodes, and the metal conductive paste may be fired together with the ceramic multilayer structure. Thus, the base layer may be formed. After forming the base layer, each plating layer may be formed on the base payer by an electrolytic plating or the like.

In the manufacturing method of the embodiment, the pinholes 60 are formed. It is therefore possible to form the bent portion. When the bent portion is formed, anchor effect is achieved and the delamination is suppressed. And, the through-hole 18 can be formed in every other internal electrode layer, in the bent portion. In this case, a plurality of through-holes 18 are formed in the same position along the stacking direction, in the bent portion. Unevenness of the structure in the stacking direction is suppressed. Therefore, stress concentration is suppressed. And degradation of the reliability is suppressed. It is therefore possible to suppress the delamination and suppress degradation of the reliability.

When the position and the number of the pinholes 60 are adjusted, it is possible to form the through-hole 18 in two or more of the internal electrode layers, in the bent portion. In the embodiment, it is possible to manufacture the multilayer ceramic capacitor having high reliability and having a small size and a large capacity. For example, when the multilayer ceramic capacitor has X8R property of EIA standard, the multilayer ceramic capacitor has a 0603 size in which a length is 0.6±0.03 mm, a width is 0.3±0.03 mm, and a height is 0.3±0.03 mm, has a rated voltage of 16 V or 25 V, and a capacity value of 0.22 μF or more. When the multilayer ceramic capacitor has X7R property of EIA standard, the multilayer ceramic capacitor has a 1005 size in which a length is 1.0+0.15/−0.05 mm, a width is 0.5+0.15/−0.05 mm, and a height is 0.5+0.15/−0.05 mm, has a rated voltage of 25 V, and a capacity value of 0.47 μF or more. When the multilayer ceramic capacitor has X7R property of EIA standard, the multilayer ceramic capacitor has a 1005 size, has a rated voltage of 50 V, and a capacity value of 0.22 μF or more.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

Although the embodiments of the present invention have been described in detail, it is to be understood that the various change, substitutions, and alterations could be made hereto without departing from the spirit and scope of the invention.

What is claimed is:

1. A ceramic electronic device comprising:
a multilayer chip in which each of a plurality of dielectric layers and each of a plurality of internal electrode layers are alternately stacked, a main component of the plurality of dielectric layers being ceramic, the multilayer chip having a rectangular parallelepiped shape, the plurality of internal electrode layers being alternately exposed to a first end face and a second end face of the multilayer structure, the first end face facing with the second end face,
wherein a bent portion, in which the plurality of dielectric layers in a substantially same position along a stacking direction project along the stacking direction, is formed in the multilayer chip,
wherein, in the bent portion, a through-hole is formed in two or more of the plurality of internal electrode layers,
wherein the through-hole is a defect portion in a first direction in which the first end face faces with the second end face and in a second direction that is vertical to the first direction in a plane of the plurality of internal electrode layers, and
wherein the through-hole extends to neither an end in the first direction nor an end in the second direction in the two or more of the plurality of internal electrode layers.

2. The ceramic electronic device as claimed in claim 1, wherein the plurality of dielectric layers are bent so that bending degree of the plurality of dielectric layers is lessened toward a convex edge of the bent portion.

3. The ceramic electronic device as claimed in claim 1, wherein an angle formed by the bent portion sandwiching the through-hole is less than 120 degrees in the first direction and the second direction.

4. The ceramic electronic device as claimed in claim 1, wherein the bent portion is located within a range of which a thickness is 1/6 or more and 1/4 or less of the multilayer chip.

5. The ceramic electronic device as claimed in claim 1, wherein the bent portion is located in at least a part of both 1/5 thickness ranges of the multilayer chip in the stacking direction.

6. The ceramic electronic device as claimed in claim 1, wherein the bent portion is located within a circumference portion having 1/5 width of the multilayer chip, when viewed from an upper face or a lower face of the multilayer chip in the stacking direction.

7. The ceramic electronic device as claimed in claim 1, wherein, on a presumption that the multilayer chip is divided into five portions having an equal width in the first direction, the bent portion is located in both two edge equal portions of the five equal portions.

8. The ceramic electronic device as claimed in claim 1, wherein, on a presumption that the multilayer chip is divided into five portions having an equal thickness in the stacking direction, the bent portion is located in at least a part of center three of the five equal portions.

9. The ceramic electronic device as claimed in claim 1, wherein the ceramic electronic device is a multilayer ceramic capacitor.

10. The ceramic electronic device as claimed in claim 1,
wherein the ceramic electronic device is a multilayer ceramic capacitor,
wherein the multilayer ceramic capacitor has X7R property, has a 0603 size, has a rated voltage of 16 V or 25 V, and has a capacity value of 0.22 µF or more.

11. The ceramic electronic device as claimed in claim 1,
wherein the ceramic electronic device is a multilayer ceramic capacitor,
wherein the multilayer ceramic capacitor has X7R property, has a 1005 size, has a rated voltage of 25 V, and has a capacity value of 0.47 µF or more.

12. The ceramic electronic device as claimed in claim 1,
wherein the ceramic electronic device is a multilayer ceramic capacitor,
wherein the multilayer ceramic capacitor has X7R property, has a 1005 size, has a rated voltage of 50 V, and has a capacity value of 0.22 µF or more.

13. The ceramic electronic device as claimed in claim 1, wherein the through-hole is formed in every other internal electrode layer.

14. The ceramic electronic device as claimed in claim 1, wherein the ceramic electronic device has a length of 0.25±0.02 mm, a width of 0.125±0.02 mm and a height of 0.125±0.02 mm.

15. The ceramic electronic device as claimed in claim 1, wherein a diameter of the through-hole is 10 µm to 100 µm.

* * * * *